(12) United States Patent
Fowler (10) Patent No.: US 11,539,875 B1
(45) Date of Patent: Dec. 27, 2022

(54) IMAGE-FOCUSING METHOD AND ASSOCIATED IMAGE SENSOR

(71) Applicant: OmniVision Technologies, Inc., Santa Clara, CA (US)

(72) Inventor: Boyd Fowler, Sunnyvale, CA (US)

(73) Assignee: OmniVision Technologies Inc., Santa Clara, CA (US)

( * ) Notice: Subject to any disclaimer, the term of this patent is extended or adjusted under 35 U.S.C. 154(b) by 0 days.

(21) Appl. No.: 17/459,181

(22) Filed: Aug. 27, 2021

(51) Int. Cl.
*H04N 5/232* (2006.01)
*G06K 9/62* (2022.01)
*G02B 7/34* (2021.01)
*H04N 5/369* (2011.01)

(52) U.S. Cl.
CPC ....... *H04N 5/232122* (2018.08); *G02B 7/346* (2013.01); *G06K 9/6256* (2013.01); *H04N 5/36961* (2018.08)

(58) Field of Classification Search
None
See application file for complete search history.

(56) References Cited

U.S. PATENT DOCUMENTS

| | | | | | |
|---|---|---|---|---|---|
| 2010/0309335 | A1* | 12/2010 | Brunner | ......... | H04N 5/781 348/E5.031 |
| 2013/0329095 | A1* | 12/2013 | Aoki | ......... | G02B 7/34 348/241 |
| 2014/0022439 | A1* | 1/2014 | Aoki | ......... | G02B 7/34 348/347 |
| 2014/0022445 | A1* | 1/2014 | Aoki | ......... | H04N 5/36961 348/353 |
| 2018/0278828 | A1* | 9/2018 | Moon | ......... | H04N 5/232122 |
| 2019/0075233 | A1* | 3/2019 | Galor Gluskin | ......... | H04N 5/232122 |
| 2019/0335089 | A1* | 10/2019 | Kadambala | ......... | H04N 5/23241 |

(Continued)

OTHER PUBLICATIONS

Muthukannan, K.et al. "Implementation of Artificial Neural Network for Face Recognition Using Gabor Feature Extraction," *Journal of Dental Materials & Techniques* 4, No. 2 (Nov. 2013) pp. 690-694.

(Continued)

*Primary Examiner* — Cynthia Segura
(74) *Attorney, Agent, or Firm* — Lathrop GPM LLP (57) ABSTRACT

An autofocusing method includes capturing an image of a scene with a camera that includes a pixel array; computing a horizontal-difference image, and a vertical-difference image; and combining the horizontal-difference image and the vertical-difference image to yield a combined image. The method also includes determining, from the combined image and the intensity image, an image distance with respect to a lens of the camera at which the camera forms an in-focus image. The pixel array includes horizontally-adjacent pixel pairs and vertically-adjacent pixel pairs each located beneath a respective microlens. The horizontal-difference image includes, for each horizontally-adjacent pixel pair, a derived pixel value that is an increasing function of a difference between pixel values generated by the horizontally-adjacent pixel pair. The vertical-difference image includes, for each vertically-adjacent pixel pair, a derived pixel value that is an increasing function of a difference between pixel values generated by the vertically-adjacent pixel pair.

21 Claims, 9 Drawing Sheets

(56) References Cited

U.S. PATENT DOCUMENTS

2019/0394408 A1* 12/2019 Tanaka ............... H04N 5/36961
2020/0260014 A1*  8/2020 Miyatani ................ G03B 13/36
2022/0038613 A1*  2/2022 Kobayashi ......... A61B 1/00188

OTHER PUBLICATIONS

Wei, I & Roberts, E. "Neural Network Control of Focal Position During Time-Lapse Microscopy of Cells," *Scientific Reports* 8:7313 (2018): 1-10.

* cited by examiner

FIG. 4 focus in front of sensor

FIG. 5A focus at sensor

FIG. 5B focus behind sensor     response of left photodiodes     response of right photodiodes

IMAGE-FOCUSING METHOD AND ASSOCIATED IMAGE SENSOR

BACKGROUND

Many digital cameras have autofocusing capability. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion(s) of the scene, specified by the user, and focuses the camera on such objects.

Many digital cameras use contrast autofocus, wherein the autofocus function adjusts the imaging objective to maximize contrast in at least a portion of the scene, thus bringing that portion of the scene into focus. More recently, phase-detection autofocus has gained popularity because it is faster than contrast autofocus. Phase-detection autofocus directly measures the degree of misfocus by comparing light passing through one portion of the imaging objective, e.g., the left portion, with light passing through another portion of the imaging objective, e.g., the right portion. Some digital single-lens reflex cameras include a dedicated phase-detection sensor in addition to the image sensor that captures images.

However, this solution is not feasible for more compact and/or less expensive cameras. Therefore, camera manufacturers are developing image sensors with on-chip phase detection, i.e., image sensors with integrated phase detection capability via the inclusion of phase-detection auto-focus (PDAF) pixels in the image sensor's pixel array.

SUMMARY OF THE EMBODIMENTS

Conventional PDAF imaging systems falter when imaging scenes with at least one of insufficient illumination (e.g., <10 Lux), low contrast, and limited texture. Embodiments herein remedy this deficiency.

In a first aspect, an autofocusing method includes steps of (i) capturing an image of a scene with a camera that includes a pixel array, (ii) computing a horizontal-difference image, and a vertical-difference image, (iii) combining the horizontal-difference image and the vertical-difference image to yield a combined image. The method also includes (iv) determining, from the combined image and the intensity image, an image distance with respect to a lens of the camera at which the camera forms an in-focus image of at least part of the scene; and (v) adjusting a distance between the pixel array and the lens until the distance equals the image distance.

The pixel array includes (i) a plurality of horizontally-adjacent pixel pairs, each being beneath a respective one of a first plurality of microlenses, and (ii) a plurality of vertically-adjacent pixel pairs. Each vertically-adjacent pixel pair is located beneath either (a) a respective one of the first plurality of microlenses or (b) a respective one of a second plurality of microlenses.

The horizontal-difference image includes, for each of the plurality of horizontally-adjacent pixel pairs, a first derived pixel value mapped to a location of the horizontally-adjacent pixel pair within the pixel array and being an increasing function of a difference between pixel values generated by each pixel of the horizontally-adjacent pixel pair. The vertical-difference image includes, for each of the plurality of vertically-adjacent pixel pairs, a second derived pixel value mapped to a location of the vertically-adjacent pixel pair within the pixel array and being an increasing function of a difference between pixel values generated by each pixel of the vertically-adjacent pixel pair.

In a second aspect, an image sensor includes a pixel array, a processor coupled to the pixel array, and a memory. The pixel array includes (i) a plurality of horizontally-adjacent pixel pairs, each being beneath a respective one of a first plurality of microlenses, and (ii) a plurality of vertically-adjacent pixel pairs, each being beneath either (a) a respective one of the first plurality of microlenses or (b) a respective one of a second plurality of microlenses. The memory stores machine-readable instructions that, when executed by the processor, control the processor to execute the method of the first aspect.

DETAILED DESCRIPTION OF THE EMBODIMENTS

Figure 1:
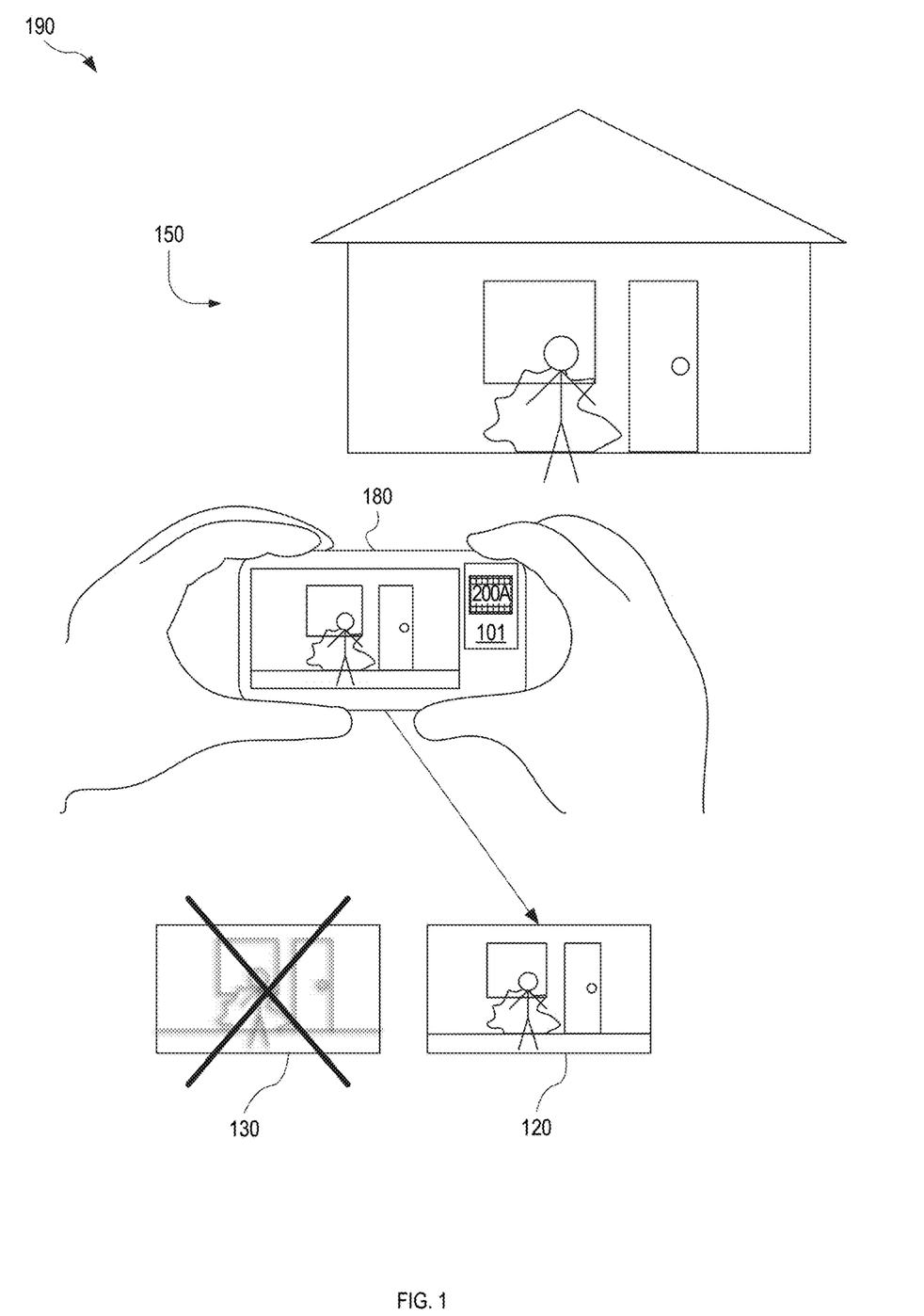
FIG. 1 illustrates an image sensor and a pixel array thereof in an exemplary use scenario.

FIG. 1 illustrates an image sensor 101 with PDAF pixels in an exemplary use scenario 190. Image sensor 101 is implemented in a digital camera 180 for imaging a scene 150. Digital camera 180 is, for example, a camera phone, a compact digital camera, a tablet camera, a computer camera, or any other camera. Digital camera 180 utilizes the on-chip phase detection capability of image sensor 101 to focus on scene 150. When focused, digital camera 180 utilizes image sensor 101 to capture a focused image 120, instead of a defocused image 130, of scene 150.

Figure 2A:
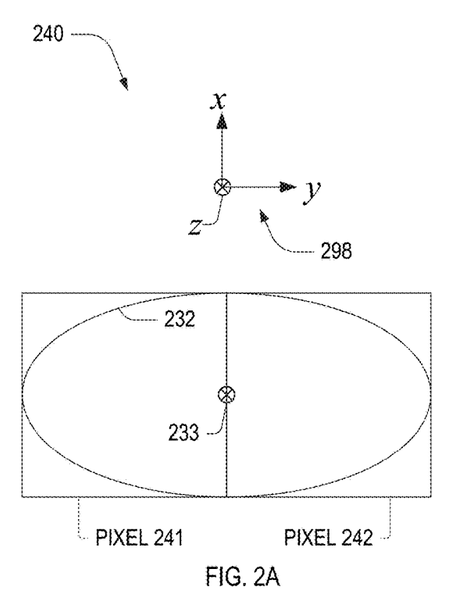
FIGS. 2A and 2B are schematic plan views of respective adjacent pixel pairs present in embodiments of the image sensor of FIG. 1.
Figure 2B:
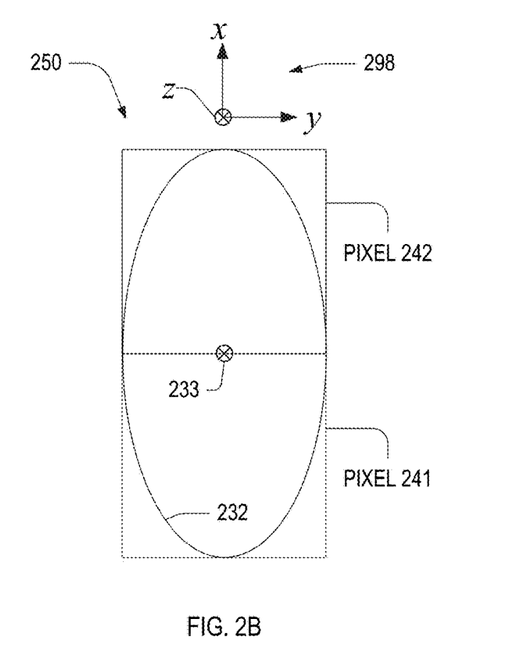

FIGS. 2A and 2B are respective schematic plan views of horizontally-adjacent pixel pair 240 and a vertically-adjacent pixel pair 250 respectively. Image sensor 101 has a pixel array 200A, shown in FIGS. 1 and 5, that includes a plurality of horizontally-adjacent pixel pairs 240 and a plurality of vertically-adjacent pixel pairs 250. In embodiments, pixel array 200A is formed in a semiconductor substrate and image sensor 101 is a complementary metal oxide semiconductor (CMOS) image sensor.

Horizontally-adjacent pixel pair 240 includes two horizontally-adjacent pixels 241 and 242, and a microlens 232. Microlens 232 is above pixels 241 and 242 and has an optical axis 233. In an embodiment, pixels 241 and 242 may form a planar array to which optical axis intersects at a 90-degree angle.

While microlens 232 is shown to have an oval cross-section in the plan view of FIGS. 2A and 2B, it may have a differently-shaped cross-section without departing from the scope hereof. For example, microlens 232 may have a rectangular cross-section in a plane parallel to the x-y plane of coordinate system 298 such that it completely covers both pixels 241 and 242. Microlens 232 may include a portion of a spherical surface, an ellipsoidal surface, or an aspheric surface.

Vertically-adjacent pixel pair 250 is horizontally-adjacent pixel pair 240 rotated by ninety degrees such that it is oriented parallel to the x-axis of coordinate system 298 and pixels 241 and 242 are vertically-adjacent. As oriented in FIG. 2B, pixels 241 and 242 may be denoted as a bottom-pixel and a top-pixel respectively.

Figure 3:
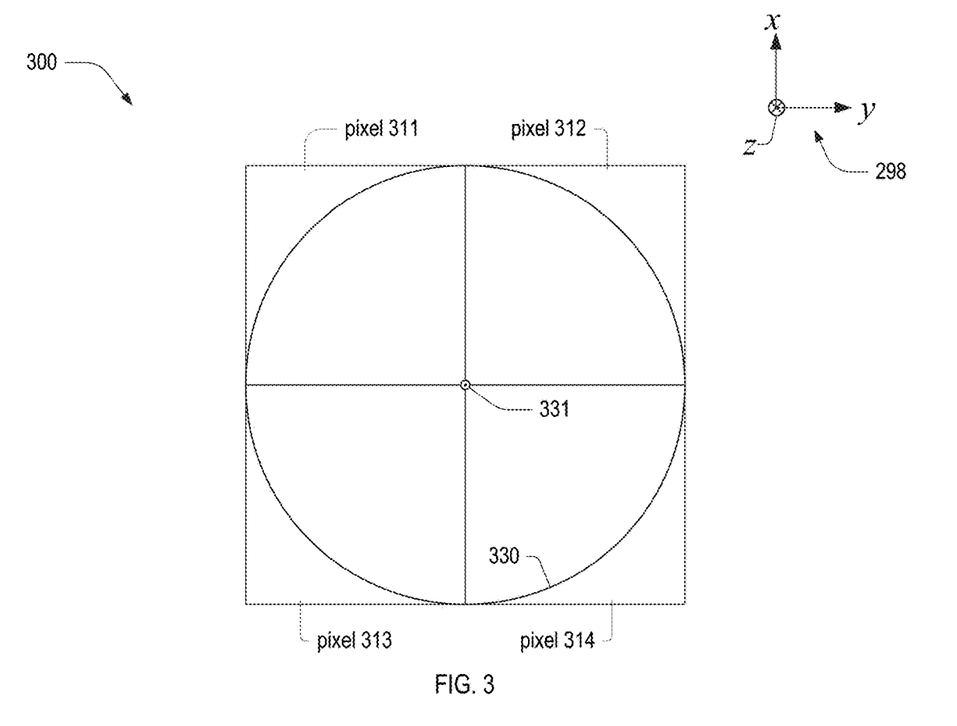
FIG. 3 is a schematic plan view of a two-by-two pixel subarray present in embodiments of the image sensor of FIG. 1.

In embodiments, each pixel 241 and pixel 242 is part of both a horizontally-adjacent pixel pair 240 and a vertically-adjacent pixel pair 250. For example, FIG. 3 is a schematic plan view of a two-by-two pixel subarray 300, which includes pixels 311, 312, 313, and 314 and a microlens 330 thereabove. Microlens 330 is positioned above pixels 311-314 such that its optical axis 331 is centered therebetween. Each side-adjacent pixel-pair of pixel subarray 300, with a region of microlens 330 thereabove, may be viewed as either a horizontally-adjacent pixel pair 240 or a vertically-adjacent pixel pair 250. Pixels 311 and 312 and a region of microlens 330 thereabove form a first horizontally-adjacent pixel pair 240. Pixels 313 and 314 and a region of microlens 330 thereabove form a second horizontally-adjacent pixel pair 240. Pixels 311 and 313 and a region of microlens 330 thereabove form a first vertically-adjacent pixel pair 250. Pixels 312 and 314 and a region of microlens 330 thereabove form a second vertically-adjacent pixel pair 250.

Figure 4:
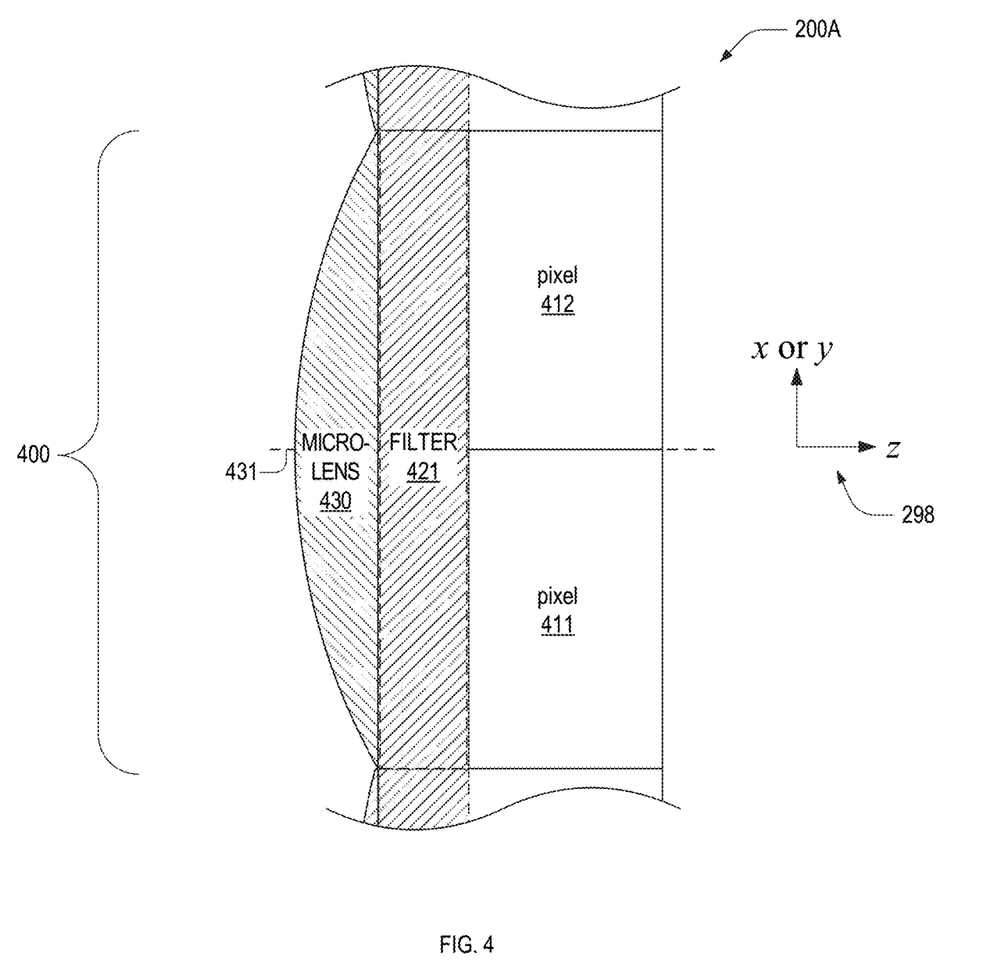
FIG. 4 is a cross-sectional view of a section of the pixel array of FIG. 1 and microlenses aligned thereto, in embodiments.

FIG. 4 is a cross-sectional view of a pixel-array region 400 of pixel array 200A that includes pixels 411 and 412 having a microlens 430 thereabove. In embodiments, pixel-array region 400 is a cross-sectional view at least one of horizontally-adjacent pixel pair 240, vertically-adjacent pixel pair 250, and two-by-two pixel subarray 300. Microlens 430 has an optical axis 431 centered between pixels 411 and 412. In embodiments, pixel array 200A includes a color filter 421 between microlens 430 and pixels 411 and 412.

Figure 5A:
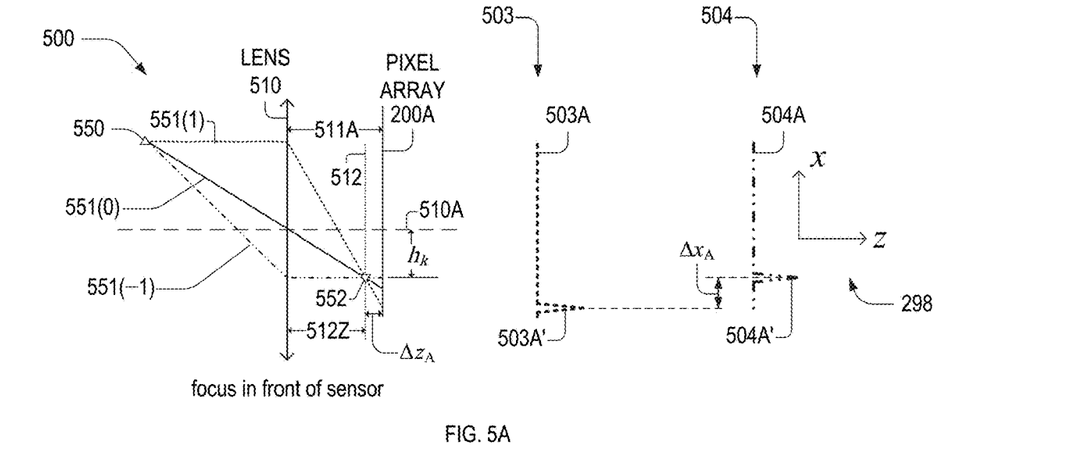
FIGS. 5A-5C are respective cross-sectional views of an imaging system that schematically illustrates focusing using phase-detection autofocus pixels.
Figure 5B:
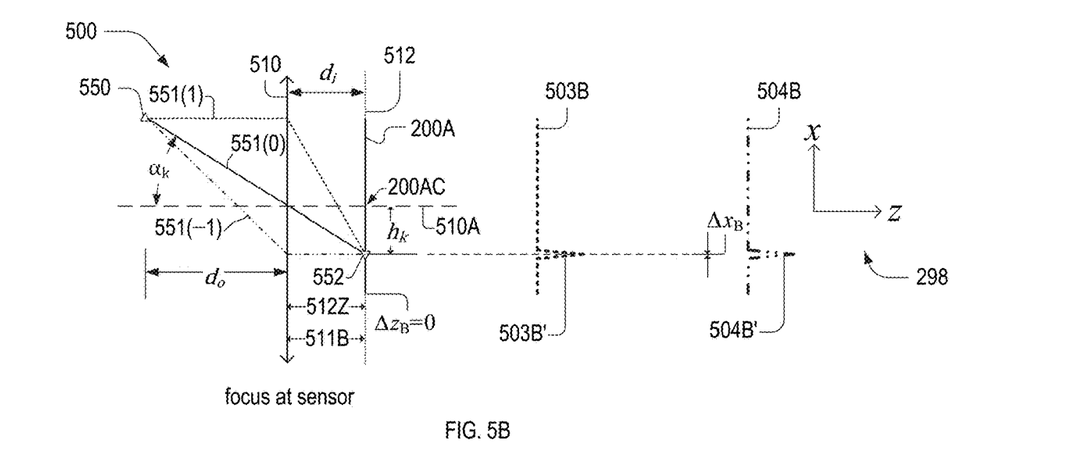
Figure 5C:
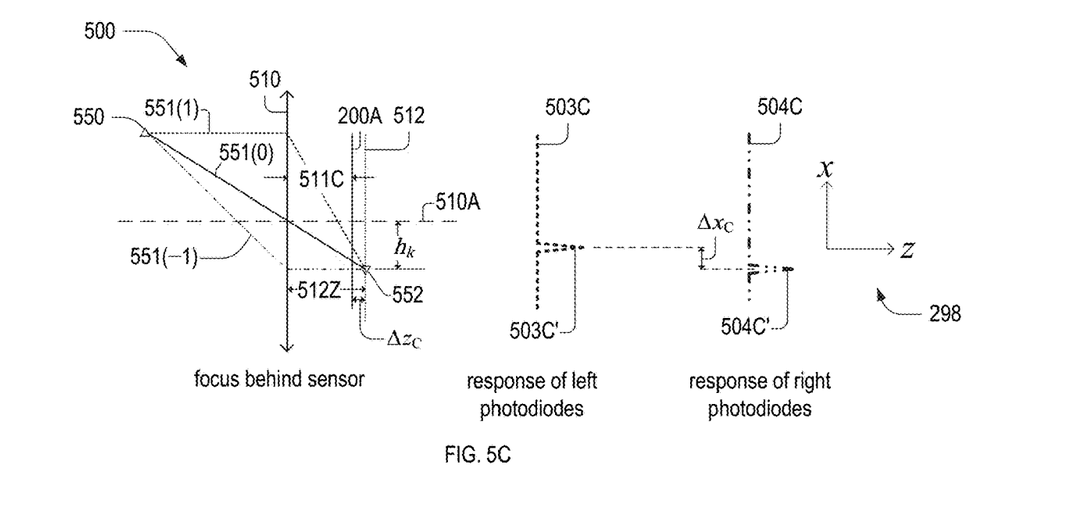

FIGS. 5A-5C are cross-sectional views of a PDAF imaging system 500 in which a lens 510 forms an image 552 of an off-axis object 550 at an image plane 512 proximate pixel array 200A. Lens 510 has an optical axis 510A that intersects pixel array 200A at a pixel-array center 200AC. Image 552 is at an image height $h_k$ from optical axis 510A and pixel-array center 200AC. Image plane 512 and lens 510 are separated by an image distance 512Z, herein also denoted by $d_i$.

FIGS. 5A-5C illustrate propagation of a chief ray 551(0), an upper marginal ray 551(1), and a lower marginal ray 551(−1). In the cross-sectional view of FIGS. 5A-5C, pixel array 200A includes a column of dual-diode PDAF pixels of FIG. 2, such as pixel pair 250 and/or two-by-two pixel subarray 300. In FIG. 5A, pixel array 200A is behind image plane 512. In FIG. 5B, pixel array 200A is coplanar with image plane 512. In FIG. 5C, pixel array 200A is in front of image plane 512.

FIGS. 5A-5C also include schematic pixel column responses 503 and 504, which represent responses of, within a column of PDAF pixels of pixel array 200A, pixels 411 and 412 respectively. In this example, for each pair of pixels 411 and 412, pixel 411 is further from optical axis 510A than is pixel 412, such that pixel 412 is between pixel 411 and optical axis 510A.

In FIG. 5A, pixel array 200A is behind image plane 512 such that image 552 is out of focus at pixel array 200A. Pixel array 200A is at a distance 511A from lens 510, which corresponds to a misfocus distance $\Delta z = \Delta z_A > 0$ from image plane 512. Pixel column response 503A illustrates that a column of left pixels detects one intensity peak 503A' corresponding to upper marginal ray 551(1). Pixel column response 504A illustrates that a column of right pixels detects one intensity peak 504A' corresponding to lower marginal ray 551(−1). Intensity peak 504A' is closer to optical axis 510A than intensity peak 503A'. On pixel array 200A, intensity peaks 503A' and 504A' are separated by a distance $\Delta x = \Delta x_A > 0$.

In FIG. 5B, pixel array 200A is located at image plane 512 such that image 552 is in focus. Pixel array 200A is at a distance 511B from lens 510, which corresponds to a misfocus distance $\Delta z = \Delta z_B = 0$ from image plane 512. Pixel column response 503B illustrates that a column of left pixels detects one intensity peak 5033 corresponding rays 551(−1,0,1) being incident on the same left-pixel in the column. Pixel column response 504B illustrates that a column of right pixels detects one intensity peak 5043 corresponding to rays 551(−1,0,1) being incident on the same right-pixel in the column. On pixel array 200A, intensity peaks 5033 and 5043 are separated by a distance $\Delta x = \&_B$, which is illustrated as equal to zero in FIG. 5B In FIG. 5C, pixel array 200A is in front of image plane 512 such that image 552 is out of focus at pixel array 200A. Pixel array 200A is at a distance 511C from lens 510, which corresponds to a misfocus distance $\Delta z = \Delta z_C < 0$ from image plane 512. Pixel column response 503C illustrates that a column of left pixels detects one intensity peak 503C' corresponding to upper marginal ray 551(1). Pixel column response 504C illustrates that a column of right pixels detects one intensity peak 504C' corresponding to lower marginal ray 551(−1). Intensity peak 504C' is further from optical axis 510A than is intensity peak 503C'. On pixel array 200A, intensity peaks 503C' and 504C' are separated by a distance $\Delta x = \Delta x_C < 0$.

One indicator of the accuracy of phase-detection autofocusing by image sensor 101, hereinafter "PDAF accuracy," is how well the magnitude of $\Delta x$ indicates the magnitude of misfocus $\Delta z$. Specifically, with reference to FIG. 5B, zero misfocus ($\Delta z = 0$) should correspond to $\Delta x = 0$. Hence, the smaller the magnitude of $\Delta x$ is when $\Delta z = 0$, the higher the PDAF accuracy.

Figure 6:
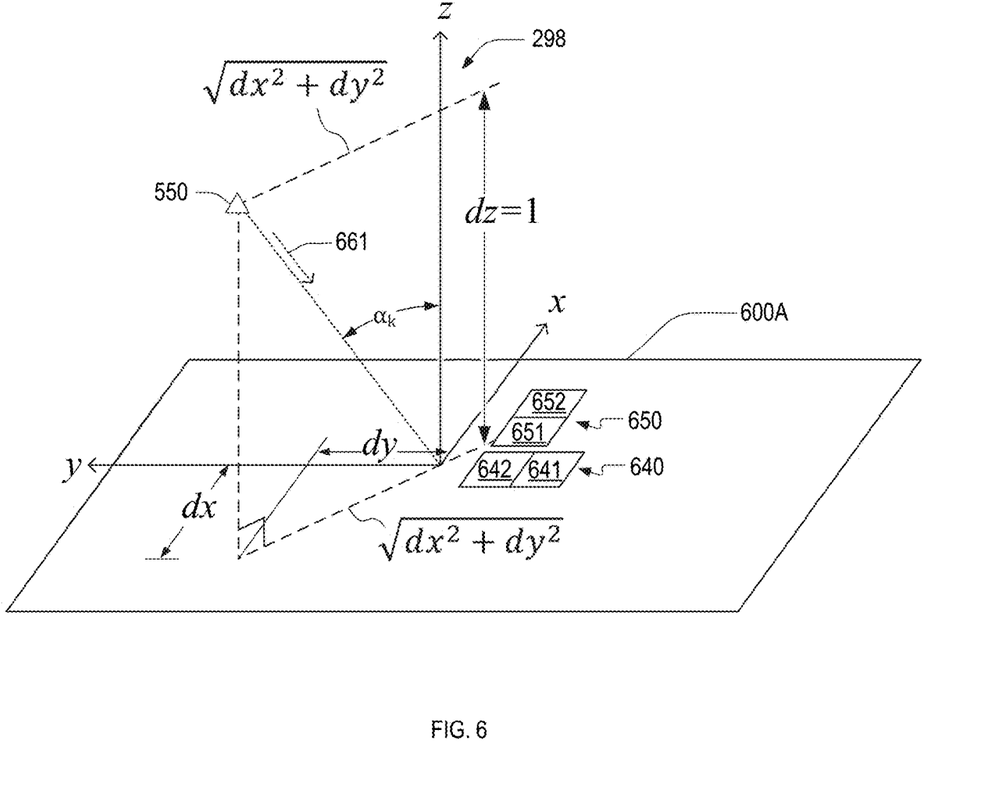
FIG. 6 is a schematic illustrating a zenith angle $\alpha_k$ of object with respect to the pixel array of FIG. 1, in embodiments.

FIG. 5B denotes image height $h_k$, an object distance $d_o$, image distance $d_i$, and a zenith angle $\alpha_k$. FIG. 6 is a schematic illustrating a zenith angle $\alpha_k$ of object 550 with respect to the z direction above a pixel array 600A. Pixel array 600A is an example of pixel array 200A. Pixel array 600A includes (i) a plurality of horizontally-adjacent pixel pairs, each being beneath a respective one of a first plurality of microlenses, and (ii) a plurality of vertically-adjacent pixel pairs. Each of the plurality of vertically-adjacent pixel pairs is beneath either (a) a respective one of the first plurality of microlenses or (b) a respective one of a second plurality of microlenses.

FIG. 6 illustrates horizontal displacement dx and a vertical displacement dy in the plane of pixel array 600A.

Zenith angle $\alpha_k$ may be expressed as a function of displacements dx and dy, and a height dz above the plane of pixel array 600A: $\alpha_k = \arctan(\sqrt{dx^2+dy^2}/dz)$. When dz=1, $\alpha_k = \arctan(\sqrt{dx^2+dy^2})$.

FIG. 6 also depicts a horizontally-adjacent pixel pair 640 and a vertically-adjacent pixel pair 650. Pixel pair 240 and 250 are examples of pixel pairs 640 and 650 respectively. Two horizontally-adjacent pixels of two-by-two pixel subarray 300, with a region of microlens 330 thereabove, is an example of horizontally-adjacent pixel pair 640. Vertically-adjacent pixels of two-by-two pixel subarray 300, with a region of microlens 330 thereabove, is an example of vertically-adjacent pixel pair 650.

Horizontally-adjacent pixel pair 640 includes pixels 641 and 642. Examples of pixels 641 and 642 include pixels 241 and 242 of FIG. 2A, pixels 311 and 312 of FIG. 3, and pixels 313 and 314 of FIG. 3. FIG. 6 depicts a chief ray 661 propagating from object 550 at zenith angle $\alpha_k$ toward horizontally-adjacent pixel pair 640. Chief ray 661 is an example of chief ray 551(0). When chief ray 661 reaches horizontally-adjacent pixel pair 640, pixels 641 and 642 generate signals that are converted into respectively pixel values $V_{641}$ and $V_{642}$. Pixel value $V_{641}$ is larger than pixel value $V_{642}$ because, in terms of propagation direction along the y axis only, chief ray 661 is propagating in the negative y direction. Accordingly, the difference $(V_{642}-V_{641})$ is a proxy for dy. For example, dy is an increasing function of difference $(V_{642}-V_{641})$.

Vertically-adjacent pixel pair 650 includes pixels 651 and 652. Examples of pixels 651 and 652 include pixels 241 and 242 of FIG. 2B, pixels 311 and 313 of FIG. 3, and pixels 312 and 314 of FIG. 3. When a chief ray 661 propagating from object 550 at zenith angle $\alpha_k$ reaches vertically-adjacent pixel pair 650, pixels 651 and 652 generate signals that are converted into respectively pixel values $V_{651}$ and $V_{652}$. Pixel value $V_{652}$ is larger than pixel value $V_{651}$ because, in terms of propagation direction along the x axis only, chief ray 661 is propagating in the positive x direction. Accordingly, the difference $(V_{652}-V_{651})$ is a proxy for dx. For example, dx is an increasing function of difference $(V_{652}-V_{651})$.

Since dx and dy are both increasing functions of $(V_{652}-V_{651})$ and $(V_{642}-V_{641})$ respectively, and zenith angle $\alpha_k$ is a function of dx and dy, as described above, then zenith angle $\alpha_k$ is also an increasing function of dx and dy. For example, zenith angle $\alpha_k$ is an increasing function of $\arctan(\sqrt{(V_{652}-V_{651})^2(V_{642}-V_{641})^2})$. As such, zenith angle $\alpha_k$ is an increasing function of simpler expressions, such as $(V_{652}-V_{651})^2+(V_{642}-V_{641})^2$ and $|V_{652}-V_{651}|+|V_{642}-V_{641}|$.

Herein and as is known in the art, a function $f(x)$ is an increasing function within an interval of x values when (i) $f(b)$ is greater than or equal to $f(a)$ where b is greater than a and (ii) both b and a are within the interval. Similarly, $f(x)$ is a strictly increasing function within the interval when $f(b)$ is greater than $f(a)$ where b is greater than a. Herein, when any first quantity is described as an increasing function of any second quantity, the increasing function is, in embodiments, a strictly increasing function. Examples of the first quantity include derived pixel values disclosed herein. Examples of the second quantity include pixel values, and expressions including one or more pixel values, generated by one or more pixels of pixel array 200A.

For thin lenses, object distance $d_o$ and image distance $d_i$ and focal length f of lens 510 satisfy the thin lens equation: $d_o^{-1}+d_i^{-1}=f^{-1}$. Zenith angle $\alpha_k$ equals $\arctan(h_k/d_i)$. The partial derivative of zenith angle $\alpha_k$ with respect to image distance $d_i$ yields $\partial\alpha_k/\partial d_i = -h_k/(d_i^2+h_k^2)$. Solving this expression for image distance $d_i$ yields $$d_i = \sqrt{-h_k\left(\frac{\partial d_i}{\partial \alpha_k} + h_k\right)}.$$

Hence, for object 550 imaged to an image height $h_k$, the image distance $d_i$ at which imaging system 500 forms an in-focus image of object 550 is a function of image height $h_k$, and $\partial d_i/\partial\alpha_k$.

However, the above expression for image distance $d_i$ applies only for simple lenses, when zenith angle $\alpha_k$ of object 550 equals the incident angle of a chief ray on pixel array 200A after its transmission through lens 510. In a typical digital camera, the imaging lenses is multi-element lens, such that the above expression for image distance $d_i$ cannot be used to focus the camera. Disclosed herein is imaging hardware, FIG. 7, and method, FIG. 8, in which images recorded by pixel array 200A are processed yield intermediate images with features that are associated with zenith angle $\alpha_k$. These intermediate images are further processed to determine image distance $d_i$.

Figure 7:
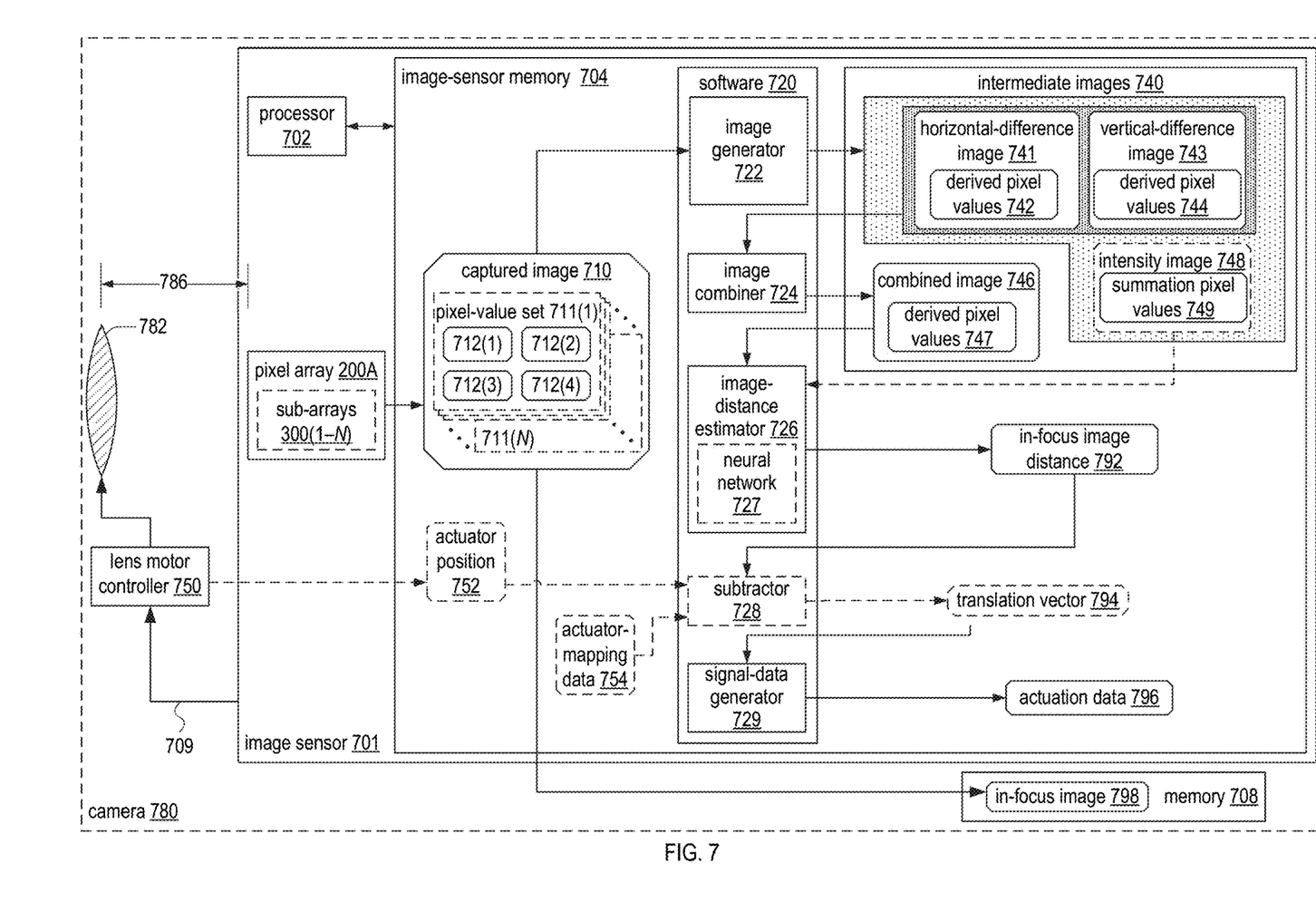
FIG. 7 is a schematic block diagram of the image sensor of FIG. 1, in embodiments.

FIG. 7 is a schematic block diagram of an image sensor 701, which is an example of image sensor 101, FIG. 1. Image sensor 701 includes pixel array 200A, a processor 702 communicatively coupled to pixel array 200A, and an image-sensor memory 704. Image-sensor memory 704 stores machine-readable instructions as software 720. Image-sensor memory 704 also stores intermediate images 740 and a computed image-distance 792.

Memory 704 represents one or both of volatile memory (e.g., RAM, DRAM, SRAM, other volatile memory known in the computer art, and any combination thereof) and non-volatile or non-transitory memory such as FLASH, ROM, magnetic memory, magnetic disk, and other nonvolatile memory known in the computer art. Memory 704 is illustratively shown storing software 720 implemented as machine readable instructions that, when executed by processor 702, control processor 702 to provide the functionality of image sensor 701 as described herein. For example, imaging lens 782 forms an image on pixel array 200A, which stores the image as a captured image 710.

In embodiments, image sensor 701 is part of a camera 780, which is an example of digital camera 180, FIG. 1. Camera 780 includes an imaging lens 782 that is configured to image a scene on to pixel array 200A. Camera 780 also includes a lens motor controller 750 communicatively coupled to image sensor 701. Lens motor controller 750 is mechanically coupled to at least one of imaging lens 782 and image sensor 701. Imaging lens 782 and pixel array 200A are separated by a distance 786, which in embodiments is along the optical axis of imaging lens 782 in perpendicular to a plane of pixel array 200A.

When pixel array 200A includes a N pixel subarrays 300($i$, N), where N is a positive integer, captured image 710 includes N pixel-value sets 711, each of which include pixel values 712(1,2,3,4). Pixel values 712(1), 712(2), 712(3), and 712(4) are generated by pixels 311, 312, 313, and 314 respectively of pixel subarray 300. In embodiments, captured image 710 is a raw image and image-sensor memory 704 stores captured image 710 in a raw image format.

Software 720 includes an image generator 722, an image combiner 724, an in-focus image-distance estimator 726, and a signal-data generator 729. In embodiments, software 720 includes a subtractor 728. In embodiments, image-sensor memory stores an actuator position 752, which may be equal to distance 786.

Image generator 722 and image combiner 724 generate intermediate images 740 from captured image 710. Image-distance estimator 726 computes an image distance 792 from intermediate images 740. When distance 786 equals image distance 792, captured image 710 is an in-focus image.

Signal-data generator 729 produces actuation data 796 from image distance 792. In embodiments, actuation data 796 includes or is derived from image distance 792. In embodiments, subtractor 728 receives an actuator position 752 from lens motor controller 750. When actuator position 752 equals distance 786, subtractor 728 generates a translation vector 794 as a difference between actuator position 752 and image distance 792. When actuator position 752 is not equal to distance 786, image-sensor memory 704 may store actuator-mapping data 754, a look-up table for example, that maps actuator position 752 to distance 786. In such embodiments, subtractor 728 generates translation vector 794 from image distance 792, actuator position 752, and actuator-mapping data 754.

Image sensor 701 transmits to lens motor controller 750 as a control signal 709. In response to receiving control signal 709, lens motor controller 750 adjusts distance 786 between imaging lens 782 and pixel array 200A until distance 786 equals computed image-distance 792 such that camera 780 captures an in-focus image 798 of a scene in a field of view of camera 780. In-focus image 798 is stored in a memory 708, which may be part of image-sensor memory 704 or a distinct storage medium therefrom.

Intermediate images 740 include a horizontal-difference image 741, which includes derived pixel values 742. Each derived pixel value 742 is mapped to a location of a respective horizontally-adjacent pixel pair within pixel array 200A. Example of horizontally-adjacent pixel pairs are horizontally-adjacent pixel pair 240 of FIG. 2A: pixels 311 and 312 of FIG. 3, and pixels 313 and 314 of FIG. 3. Each derived pixel value 742 is an increasing function of a difference between pixel values generated by each pixel of the horizontally-adjacent pixel pair.

Intermediate images 740 also include a vertical-difference image 743, which includes derived pixel values 744. Each derived pixel value 744 is mapped to a location of a respective vertically-adjacent pixel pair within pixel array 200A. Example of vertically-adjacent pixel pairs are vertically-adjacent pixel pair 250 of FIG. 2B: pixels 311 and 312 of FIG. 3, and pixels 312 and 314 of FIG. 3. Each derived pixel value 744 is an increasing function of a difference between pixel values generated by each pixel of the vertically-adjacent pixel pair.

When pixel array 200A includes pixel subarrays 300(1–N), each pixel subarray 300 generates a respective pixel-value set 711, and captured image 710 includes N pixel values sets 711(1–N). Each pixel-value set 711 includes pixel values 712(1-4). Herein, for simplifying mathematical expressions that including pixel values 712, pixel values $V_1$, $V_2$, $V_3$, and $V_4$ denote pixel values 712(1), 712(2), 712(3), and 712(4) respectively. Also herein, $D_{742}$ and $D_{744}$ denote derived pixel values 742 and 744 respectively.

In embodiments, derived pixel value 742 is an increasing function of $(V_1+V_3)-(V_2+V_4)$, where $(V_1+V_3)$ is the sum of pixel values generated by left-side pixels 311 and 313, $(V_2+V_4)$ is the sum of pixel values generated by right-side pixels 312 and 314. For example, derived pixel value 742 may equal or be proportional to $(V_1+V_3)-(V_2+V_4)$. In embodiments, derived pixel value 742 is normalized by the sum of $V_1$, $V_2$, $V_3$, and $V_4$, such that derived pixel value 742 is an increasing function of $((V_1+V_3)-(V_2+V_4))/(V_1+V_2+V_3+V_4)$. For example, derived pixel value 742 may satisfy $D_{742}=((V_1+V_3)-(V_2+V_4))/(V_1+V_2+V_3+V_4)$, hereinafter equation (1).

In embodiments, derived pixel value 744 is an increasing function of $(V_3+V_4)-(V_1+V_2)$, where $(V_3+V_4)$ is the sum of pixel values generated by bottom pixels 313 and 314, $(V_1+V_2)$ is the sum of pixel values generated by top pixels 311 and 312. For example, derived pixel value 744 may equal or be proportional to $(V_3+V_4)-(V_1+V_2)$. In embodiments, derived pixel value 744 is normalized by the sum of $V_1$, $V_2$, $V_3$, and $V_4$, such that derived pixel value 742 is an increasing function of $((V_3+V_4)-(V_1+V_2))/(V_1+V_2+V_3+V_4)$. For example, derived pixel value 744 may satisfy $D_{744}=((V_3+V_4)-(V_1+V_2))/(V_1+V_2+V_3+V_4)$, hereinafter equation (2).

Intermediate images 740 also includes a combined image 746, which includes derived pixel values 747, hereinafter also $D_{747}$. In embodiments, each derived pixel value 747 is an increasing function a sum of respective squares of the first derived pixel value and the second derived pixel value. For example, derived pixel value 747 may satisfy $D_{747}=\sqrt{D_{742}^2+D_{744}^2}$ or $D_{747}=\arctan(\sqrt{D_{742}^2+D_{744}^2})$, hereinafter, equation (3) and (4) respectively. In embodiments, each derived pixel value 747 is an increasing function of a sum of respective absolute values of the first derived pixel value and the second derived pixel value. For example, derived pixel value 747 may satisfy $D_{747}=|D_{742}|+|D_{744}|$, hereinafter, equation (5).

In embodiments, Intermediate images 740 also includes an intensity image 748, which includes summation pixel values 749, hereinafter also $D_{749}$. In embodiments, each summation pixel value 749 equals, or is proportional to, $(V_1+V_2+V_3+V_4)$.

In embodiments, image-distance estimator 726 includes a neural network 727. Neural network 727 is trained via supervised learning based on training images captured by a training camera having a training-camera lens and a training-camera pixel array that are identical to imaging lens 782 and pixel array 200A respectively. In embodiments, neural network 727 is a convolutional neural network with at least four convolutional layers. The kernel width of each convolutional layer may be eight by eight.

Figure 8:
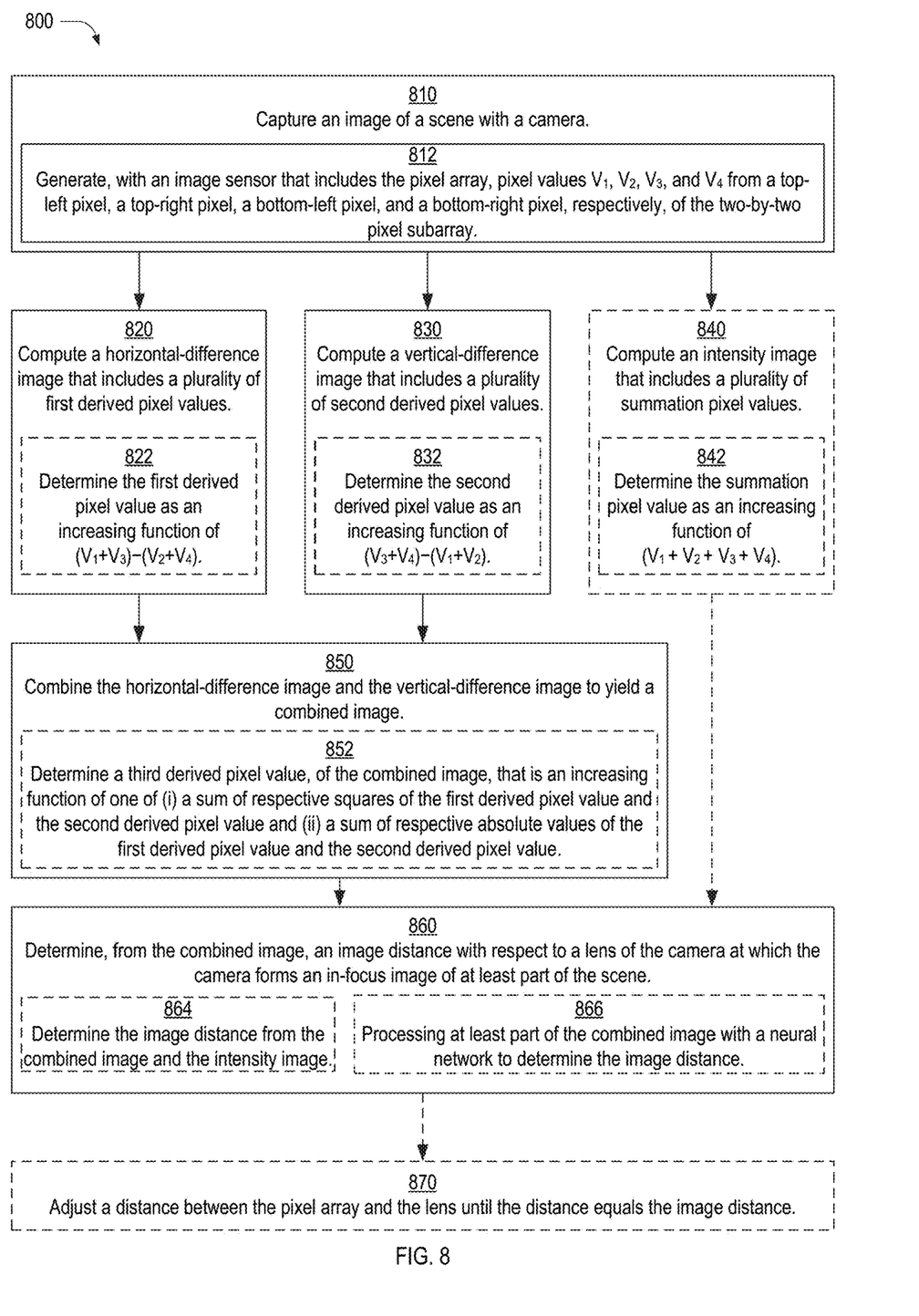
FIG. 8 is a flowchart illustrating an embodiment of an autofocusing method.

FIG. 8 is a flowchart illustrating an autofocusing method 800. In embodiments, method 800 is implemented within one or more aspects of camera 780. In embodiments, method 800 is implemented by processor 702 executing computer-readable instructions of software 720. In embodiments, method 800 includes steps 810, 820, 830, 850, and 860. Method 800 may also include at least one of step 840 and 870.

Step 810 includes capturing an image of a scene with a camera that includes a pixel array. The pixel array including (i) a plurality of horizontally-adjacent pixel pairs, each being beneath a respective one of a first plurality of microlenses, and (ii) a plurality of vertically-adjacent pixel pairs, each being beneath either (a) a respective one of the first plurality of microlenses or (b) a respective one of a second plurality of microlenses, in an example of step 810, camera 780 captures an image 710 of a scene.

Step 820 includes computing a horizontal-difference image that includes, for each of the plurality of horizontally-adjacent pixel pairs, a first derived pixel value mapped to a location of the horizontally-adjacent pixel pair within the pixel array. The first derived pixel value is an increasing function of a difference between pixel values generated by each pixel of the horizontally-adjacent pixel pair. In an example of step 820, image generator 722 computes horizontal-difference image 741, which includes derived pixel values 742.

Step 830 includes computing a vertical-difference image that includes, for each of the plurality of vertically-adjacent pixel pairs, a second derived pixel value mapped to a location of the vertically-adjacent pixel pair within the pixel array. The second derived pixel value is an increasing function of a difference between pixel values generated by each pixel of the vertically-adjacent pixel pair. In an example of step 830, image generator 722 computes vertical-difference image 743, which includes derived pixel values 744.

Step 850 includes combining the horizontal-difference image and the vertical-difference image to yield a combined image. In an example of step 850, image combiner 724 combines horizontal-difference image 741 and vertical-difference image 743 to yield combined image 746.

Step 860 includes determining, from the combined image, an image distance with respect to a lens of the camera at which the camera forms an in-focus image of at least part of the scene. In an example of step 860, image-distance estimator 726 determines image distance 792 from combined image 746.

In embodiments, method 800 omits step 850 such that either the horizontal-difference image produced by step 820 or the vertical-difference image produced by step 830 functions as the combined image input to step 860. In such embodiments, method 800 may accordingly skip either step 820 or step 830.

In embodiments, step 860 includes step 864, for example, when method 800 includes step 840. Step 864 includes determining, from the combined image and the intensity image, an image distance with respect to a lens of the camera at which the camera forms an in-focus image of at least part of the scene. In an example of step 864, image-distance estimator 726 determines image distance 792 from combined image 746 and intensity image 748.

In embodiments, captured image 710 is of a scene that includes several objects at different respective distances from camera 780, such that no single distance 786 between imaging lens 782 and pixel array 200A will yield a captured image 710 in which each of the several objects are in focus. Accordingly, in an example of step 860, image-distance estimator 726 determines image distance 792 from a region-of-interest of combined image 746, where the region-of-interest excludes at least one region of combined image 746.

In embodiments, step 860 includes step 866, which includes processing at least part of the combined image with a neural network to determine the image distance. The neural network of step 866 is trained via supervised learning based on training images captured by a training camera having a training-camera lens and a training-camera pixel array that are identical to the lens and the pixel array respectively. In an example of step 866, neural network 727 processes at least part of combined image 746 to determine image distance 792.

Step 870 includes adjusting a distance between the pixel array and the lens until the distance equals the image distance. In an example of step 870, in response to control signal 709, lens motor controller 750 adjusts distance 786 until distance 786 equals image distance 792.

In embodiments of method 800, each of the plurality of vertically-adjacent pixel pairs is beneath a respective one of the first plurality of microlenses. In such embodiments, as illustrated by two-by-two pixel subarray 300, FIG. 3, each of the first plurality of microlenses is above a respective two-by-two pixel subarray, of a plurality of two-by-two pixel subarrays of the pixel array. Each pixel of the two-by-two pixel subarray is both (i) a pixel of one of the plurality of horizontally-adjacent pixel pairs and (ii) a pixel of one of the plurality of vertically-adjacent pixel pairs. In such embodiments, steps 810, 820, 830, 840, and 850 include steps 812, 822, 832, 842, and 852, respectively.

Step 812 includes capturing comprising generating, with an image sensor that includes the pixel array, pixel values $V_1, V_2, V_3,$ and $V_4$ from a top-left pixel, a top-right pixel, a bottom-left pixel, and a bottom-right pixel, respectively, of the two-by-two pixel subarray. In an example of step 812, pixel array 200A generates pixel-value sets 711(1–N). Each pixel-value set 711 includes pixel values 712(1), 712(2), 712(3), and 712(4), which as stated in the description of FIG. 7 above are denoted by $V_1, V_2, V_3,$ and $V_4$.

Step 822 includes computing the horizontal-difference image comprising determining the first derived pixel value as a first increasing function of $(V_1+V_3)-(V_2+V_4)$. In an example of step 822, image generator 722 determines, for each pixel subarray 300, a derived pixel value 742 as a first increasing function of $(V_1+V_3)-(V_2+V_4)$. Equation (1) is an example of the first increasing function.

Step 832 includes computing the vertical-difference image comprising determining the second derived pixel value as a second increasing function of $(V_3+V_4)-(V_1+V_2)$. In an example of step 832, image generator 722 determines, for each pixel subarray 300, a derived pixel value 744 as a second increasing function of $(V_3+V_4)-(V_1+V_2)$. Equation (2) is an example of the second increasing function.

Step 842 includes computing an intensity image comprising determining the summation pixel value as a third increasing function of $(V_1+V_2+V_3+V_4)$. In an example of step 832, image generator 722 determines, for each pixel subarray 300, a summation pixel value 749 that is an increasing function of $(V_1+V_2+V_3+V_4)$. Summation pixel value 749 may be equal to or be proportional to $(V_1+V_2+V_3+V_4)$.

Step 852 includes determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value. In an example of step 852, image combiner 724 determines derived pixel values 747 according to one of equations (3), (4), and (5).

Figure 9:
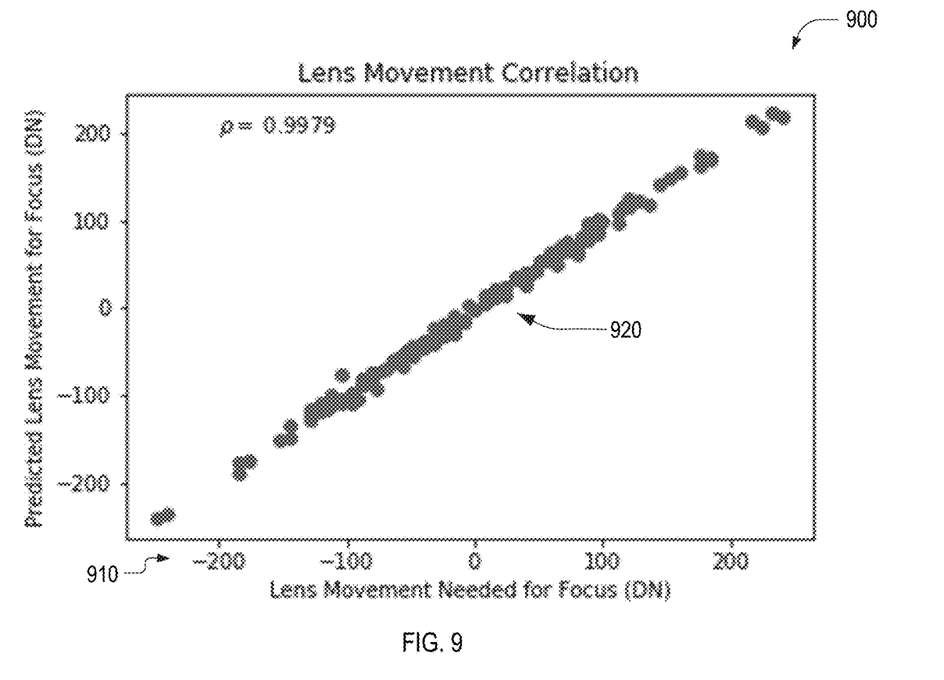
FIGS. 9-11 are illustrate example focusing accuracy of the image sensor of FIG. 1 implementing the method of FIG. 9, in embodiments.
Figure 10:
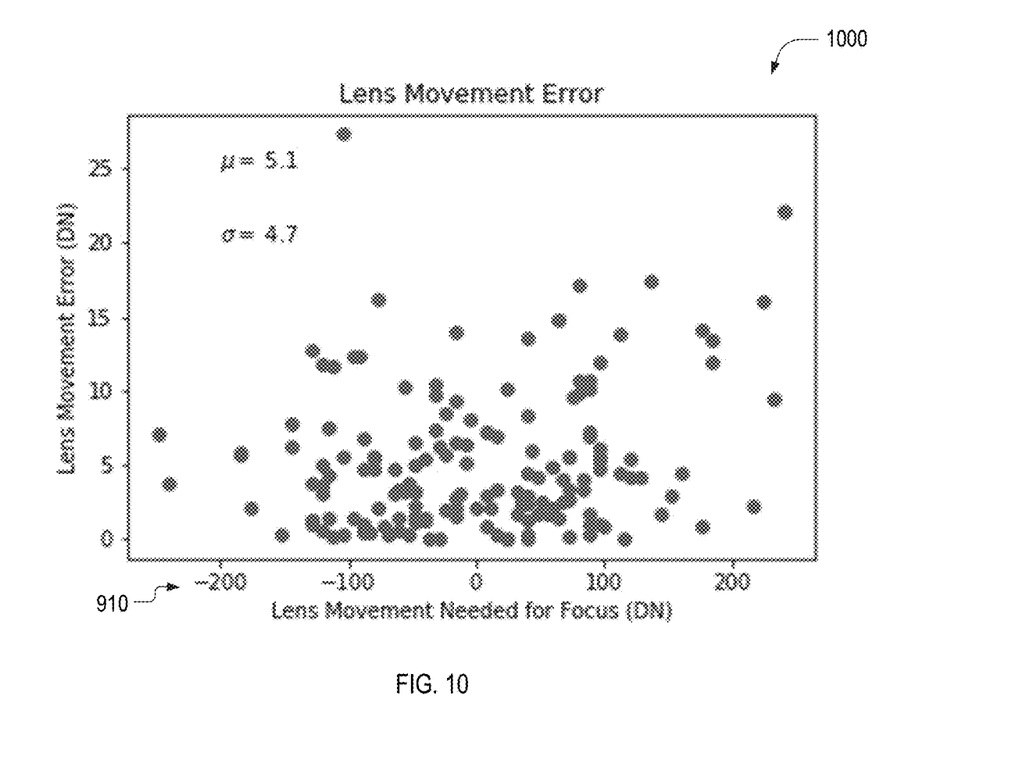
Figure 11:
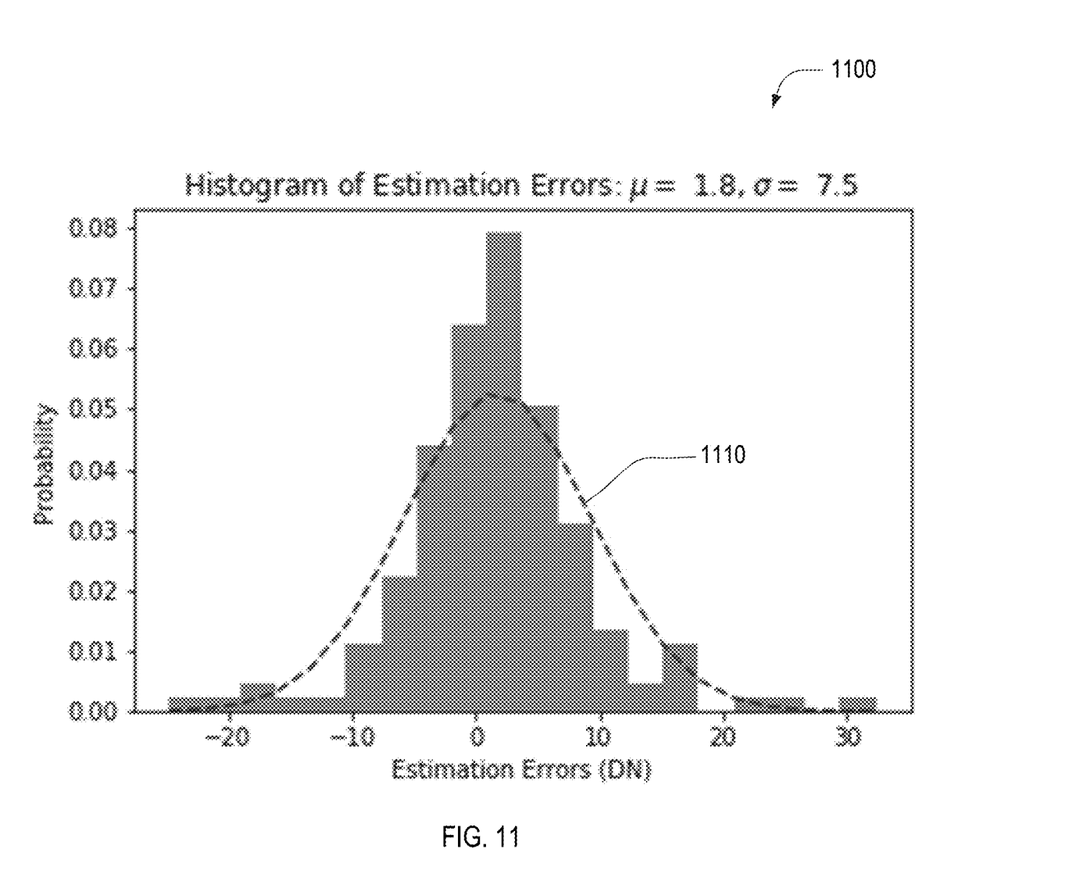

FIGS. 9-11 are show performance results for an embodiment of camera 780 using neural network 727. In this embodiment, neural network 727 is a convolutional neural network having four layers and ten 8x8 convolution kernels per layer. The convolutional neural network was trained using T training-image data sets each including N images. In this example T=17 and N=50. In seven of the training-image data sets, each image was a photographic gray card. Each image of the remaining ten training-image data sets were photographs of either and indoor or an outdoor scene. In embodiments, for each training set, there are N images of the same scene. The scene includes N objects, each of which is located at a respective on of N different distances from the camera, such that a different object of the fifty objects is in focus in each image.

Images of each dataset were randomly allocated to one of three groups: sixty percent for training, twenty percent for validation, and twenty percent for testing. During training, the weights of neural network 727 were optimized using a mean-absolute-error metric and Adam optimization.

FIG. 9 is a scatter plot 900 showing, for an embodiment of camera 780, predicted lens movements 920 needed for focus as a function of actual lens movements 910 needed for focus. The predicted lens movement is an example of translation vector 794, FIG. 7. In scatter plot 900, ρ denotes Spearman's rank correlation coefficient, and DN (digital number) is an arbitrary unit.

FIG. 10 is a scatter plot 1000 showing lens movement errors (gray dots) as a function of actual lens movement 910. The lens movement errors are derived from scatter plot 900. The mean and standard deviation of the lens movement errors are, in arbitrary units, 5.1 and 4.7 respectively.

FIG. 11 is a histogram 1100 of the lens movement errors of scatter plot 900. Histogram 1100 includes a Gaussian fit 1110 to the histogram data. Both the histogram data and the Gaussian fit have a mean value μ=1.8 and a standard deviation σ=7.5.

Combinations of Features

Features described above as well as those claimed below may be combined in various ways without departing from the scope hereof. The following enumerated examples illustrate some possible, non-limiting combinations:

(A1) An autofocusing method includes steps of (i) capturing an image of a scene with a camera that includes a pixel array, (ii) computing a horizontal-difference image, and a vertical-difference image, (iii) combining the horizontal-difference image and the vertical-difference image to yield a combined image. The method also includes (iv) determining, from the combined image and the intensity image, an image distance with respect to a lens of the camera at which the camera forms an in-focus image of at least part of the scene; and (v) adjusting a distance between the pixel array and the lens until the distance equals the image distance.

The pixel array includes (i) a plurality of horizontally-adjacent pixel pairs, each being beneath a respective one of a first plurality of microlenses, and (ii) a plurality of vertically-adjacent pixel pairs. Each vertically-adjacent pixel pair is located beneath either (a) a respective one of the first plurality of microlenses or (b) a respective one of a second plurality of microlenses.

The horizontal-difference image includes, for each of the plurality of horizontally-adjacent pixel pairs, a first derived pixel value mapped to a location of the horizontally-adjacent pixel pair within the pixel array and being an increasing function of a difference between pixel values generated by each pixel of the horizontally-adjacent pixel pair. The vertical-difference image includes, for each of the plurality of vertically-adjacent pixel pairs, a second derived pixel value mapped to a location of the vertically-adjacent pixel pair within the pixel array and being an increasing function of a difference between pixel values generated by each pixel of the vertically-adjacent pixel pair.

(A2) In embodiments of method (A1), each of the plurality of vertically-adjacent pixel pairs is beneath a respective one of the first plurality of microlenses, each of the first plurality of microlenses being is a respective two-by-two pixel subarray, of a plurality of two-by-two pixel subarrays of the pixel array, each pixel of the two-by-two pixel subarray is both (i) a pixel of one of the plurality of horizontally-adjacent pixel pairs and (ii) a pixel of one of the plurality of vertically-adjacent pixel pairs.

(A3) In embodiments of method (A2), for each of the plurality of two-by-two pixel subarrays: capturing includes generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray; computing the horizontal-difference image includes determining the first derived pixel value as a first increasing function of $(V_1+V_3)-(V_2+V_4)$; computing the vertical-difference image includes determining the second derived pixel value as a second increasing function of $(V_3+V_4)-(V_1+V_2)$; and combining includes determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

(A4) In embodiments of method (A3) the third increasing function is a linear function of the arctangent of the square root of the sum of the respective squares of the first derived pixel value and the second derived pixel value.

(A5) In embodiments of either of methods (A3) and (A4), the increasing function includes an arctangent function.

(A6) In embodiments of any one of (A2)-(A5), capturing includes generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray; computing the horizontal-difference image includes determining the first derived pixel value as a first increasing function of $((V_1+V_3)-(V_2+V_4))/(V_1+V_2+V_3+V_4)$; computing the vertical-difference image includes determining the second derived pixel value as a second increasing function of $((V_3+V_4)-(V_1+V_2))/(V_1+V_2+V_3+V_4)$; and combining includes determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

(A7) In embodiments of any one of methods (A1)-(A6), determining includes processing at least part of the combined image with a neural network to determine the image distance, the neural network having been trained via supervised learning based on training images captured by a training camera having a training-camera lens and a training-camera pixel array that are identical to the lens and the pixel array respectively (A8) Embodiments of any one of methods (A1)-(A7) further include computing an intensity image that includes, for each of the plurality of horizontally-adjacent pixel pairs and a most proximate vertically-adjacent pixel pair of the plurality of vertically-adjacent pixel pairs thereto, a summation pixel value being (i) mapped to a location within the pixel array adjacent to one of the horizontally-adjacent pixel pair and the most proximate vertically-adjacent pixel pair and (ii) an increasing function of a sum of pixel values generated by each pixel of the horizontally-adjacent pixel pair and the most proximate vertically-adjacent pixel pair. Said embodiments also include determining the image distance comprising determining the image distance from the combined image and the intensity image.

(A9) In embodiments of method (A8), each of the plurality of vertically-adjacent pixel pairs is beneath a respective one of the first plurality of microlenses, each of the first plurality of microlenses being is a respective two-by-two pixel subarray, of a plurality of two-by-two pixel subarrays of the pixel array, each pixel of the two-by-two pixel subarray is both (i) a pixel of one of the plurality of horizontally-adjacent pixel pairs and (ii) a pixel of one of the plurality of vertically-adjacent pixel pairs.

(A10) In embodiments of method (A9), for each of the plurality of two-by-two pixel subarrays, capturing includes generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray. Computing the horizontal-difference image includes determining the first derived pixel value as a first increasing function of $(V_1+V_3)-(V_2+V_4)$. Computing the vertical-difference image includes determining the second derived pixel value as a second increasing function of $(V_3+V_4)-(V_1+V_2)$. Computing the intensity image includes determining the summation pixel value as a third increasing function of $(V_1+V_2+V_3+V_4)$. Combining includes determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

(A11) In embodiments of method (A10), the third increasing function is a linear function of the arctangent of the square root of the sum of the respective squares of the first derived pixel value and the second derived pixel value.

(A12) In embodiments of method (A10) or (A11), the increasing function includes an arctangent function.

(A13) In embodiments of any of methods (A9)-(A12), capturing includes generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray. Computing the horizontal-difference image includes determining the first derived pixel value as a first increasing function of $((V_1+V_3)-(V_2+V_4))/(V_1+V_2+V_3+V_4)$. Computing the vertical-difference image includes determining the second derived pixel value as a second increasing function of $((V_3+V_4)-(V_1+V_2))/(V_1+V_2+V_3+V_4)$. Combining includes determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

(B1) An image sensor includes a pixel array, a processor coupled to the pixel array, and a memory. The pixel array includes (i) a plurality of horizontally-adjacent pixel pairs, each being beneath a respective one of a first plurality of microlenses, and (ii) a plurality of vertically-adjacent pixel pairs, each being beneath either (a) a respective one of the first plurality of microlenses or (b) a respective one of a second plurality of microlenses. The memory stores machine-readable instructions that, when executed by the processor, control the processor to execute any of methods (A1), (A7), and (A8).

(B2) In embodiments of image sensor (B1), each of the plurality of vertically-adjacent pixel pairs is beneath a respective one of the first plurality of microlenses, each of the first plurality of microlenses is above a respective two-by-two pixel subarray, of a plurality of two-by-two pixel subarrays of the pixel array, each pixel of the two-by-two pixel subarray is both (i) a pixel of one of the plurality of horizontally-adjacent pixel pairs and (ii) a pixel of one of the plurality of vertically-adjacent pixel pairs.

(B3) In embodiments of image sensor (B2), the memory further stores machine-readable instructions that, when executed by the processor, control the processor to, for each of the plurality of two-by-two pixel subarrays, execute any of methods (A1)-(A13).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:
1. An autofocusing method comprising:
   capturing an image of a scene with a camera that includes a pixel array, the pixel array including (i) a plurality of horizontally-adjacent pixel pairs, each being beneath a respective one of a first plurality of microlenses, and (ii) a plurality of vertically-adjacent pixel pairs, each being beneath either (a) a respective one of the first plurality of microlenses or (b) a respective one of a second plurality of microlenses;
   computing a horizontal-difference image that includes, for each of the plurality of horizontally-adjacent pixel pairs, a first derived pixel value mapped to a location of the horizontally-adjacent pixel pair within the pixel array and being an increasing function of a difference between pixel values generated by each pixel of the horizontally-adjacent pixel pair;
   computing a vertical-difference image that includes, for each of the plurality of vertically-adjacent pixel pairs, a second derived pixel value mapped to a location of the vertically-adjacent pixel pair within the pixel array and being an increasing function of a difference between pixel values generated by each pixel of the vertically-adjacent pixel pair;
   combining the horizontal-difference image and the vertical-difference image to yield a combined image;
   determining, from the combined image, an image distance with respect to a lens of the camera at which the camera forms an in-focus image of at least part of the scene; and
   adjusting a distance between the pixel array and the lens until the distance equals the image distance.

2. The method of claim 1, each of the plurality of vertically-adjacent pixel pairs being beneath a respective one of the first plurality of microlenses, each of the first plurality of microlenses being above a respective two-by-two pixel subarray, of a plurality of two-by-two pixel subarrays of the pixel array, each pixel of the two-by-two pixel subarray being both (i) a pixel of one of the plurality of horizontally-adjacent pixel pairs and (ii) a pixel of one of the plurality of vertically-adjacent pixel pairs.

3. The method of claim 2, for each of the plurality of two-by-two pixel subarrays:
   capturing comprising generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray;
   computing the horizontal-difference image comprising determining the first derived pixel value as a first increasing function of $(V_1+V_3)-(V_2+V_4)$;

computing the vertical-difference image comprising determining the second derived pixel value as a second increasing function of $(V_3+V_4)-(V_1+V_2)$; and combining comprising determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

4. The method of claim 3, the third increasing function being a linear function of the arctangent of the square root of the sum of the respective squares of the first derived pixel value and the second derived pixel value.

5. The method of claim 3, the increasing function including an arctangent function.

6. The method of claim 2, capturing comprising generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray;

computing the vertical-difference image comprising determining the second derived pixel value as a first increasing function of $(V_1+V_3)-V_2+V_4))/(V_1+V_2+V_3+V_4)$;

computing the horizontal-difference image comprising determining the first derived pixel value as a second increasing function of $((V_3+V_4)-(V_1+V_2))/(V_1+V_2+V_3+V_4)$; and combining comprising determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

7. The method of claim 1, determining comprising:

processing at least part of the combined image with a neural network to determine the image distance, the neural network having been trained via supervised learning based on training images captured by a training camera having a training-camera lens and a training-camera pixel array that are identical to the lens and the pixel array respectively.

8. The method of claim 1, further comprising:

computing an intensity image that includes, for each of the plurality of horizontally-adjacent pixel pairs and a most proximate vertically-adjacent pixel pair of the plurality of vertically-adjacent pixel pairs thereto, a summation pixel value being (i) mapped to a location within the pixel array adjacent to one of the horizontally-adjacent pixel pair and the most proximate vertically-adjacent pixel pair and (ii) an increasing function of a sum of pixel values generated by each pixel of the horizontally-adjacent pixel pair and the most proximate vertically-adjacent pixel pair; and determining the image distance comprising determining the image distance from the combined image and the intensity image.

9. The method of claim 8, each of the plurality of vertically-adjacent pixel pairs being beneath a respective one of the first plurality of microlenses, each of the first plurality of microlenses being above a respective two-by-two pixel subarray, of a plurality of two-by-two pixel subarrays of the pixel array, each pixel of the two-by-two pixel subarray being both (i) a pixel of one of the plurality of horizontally-adjacent pixel pairs and (ii) a pixel of one of the plurality of vertically-adjacent pixel pairs.

10. The method of claim 9, for each of the plurality of two-by-two pixel subarrays:

capturing comprising generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray;

computing the horizontal-difference image comprising determining the first derived pixel value as a first increasing function of $(V_1+V_3)-(V_2+V_4)$;

computing the vertical-difference image comprising determining the second derived pixel value as a second increasing function of $(V_3+V_4)-(V_1+V_2)$;

computing the intensity image comprising determining the summation pixel value as a third increasing function of $(V_1+V_2+V_3+V_4)$; and the combining comprising determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

11. The method of claim 10, the third increasing function being a linear function of the arctangent of the square root of the sum of the respective squares of the first derived pixel value and the second derived pixel value.

12. The method of claim 10, the increasing function including an arctangent function.

13. The method of claim 9, capturing comprising generating, with an image sensor that includes the pixel array, pixel values $V_1$, $V_2$, $V_3$, and $V_4$ from a top-left pixel, a top-right pixel, a bottom-left pixel, and a bottom-right pixel, respectively, of the two-by-two pixel subarray;

computing the horizontal-difference image comprising determining the first derived pixel value as a first increasing function of $((V_1+V_3)-(V_2+V_4))/(V_1+V_2+V_3+V_4)$;

computing the vertical-difference image comprising determining the second derived pixel value as a second increasing function of $((V_3+V_4)-(V_1+V_2))/(V_1+V_2+V_3+V_4)$; and combining comprising determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

14. An image sensor comprising:

a pixel array including (i) a plurality of horizontally-adjacent pixel pairs, each being beneath a respective one of a first plurality of microlenses, and (ii) a plurality of vertically-adjacent pixel pairs, each being beneath either (a) a respective one of the first plurality of microlenses or (b) a respective one of a second plurality of microlenses;

a processor coupled to the pixel array; and a memory storing machine-readable instructions that, when executed by the processor, control the processor to:

capture an image of a scene with a camera that includes the pixel array;

compute a horizontal-difference image that includes, for each of the plurality of horizontally-adjacent pixel pairs, a first derived pixel value mapped to a location of the horizontally-adjacent pixel pair within the pixel array and being an increasing function of a difference between pixel values generated by each pixel of the horizontally-adjacent pixel pair;

compute a vertical-difference image that includes, for each of the plurality of vertically-adjacent pixel pairs, a second derived pixel value mapped to a location of the vertically-adjacent pixel pair within the pixel array and being an increasing function of a difference between pixel values generated by each pixel of the vertically-adjacent pixel pair;

combine the horizontal-difference image and the vertical-difference image to yield a combined image;

determine, from the combined image, an image distance with respect to a lens of the camera at which the camera forms an in-focus image of at least part of the scene; and adjust a distance between the pixel array and the lens until the distance equals the image distance.

15. The image sensor of claim 14, each of the plurality of vertically-adjacent pixel pairs being beneath a respective one of the first plurality of microlenses, each of the first plurality of microlenses being above a respective two-by-two pixel subarray, of a plurality of two-by-two pixel subarrays of the pixel array, each pixel of the two-by-two pixel subarray being both (i) a pixel of one of the plurality of horizontally-adjacent pixel pairs and (ii) a pixel of one of the plurality of vertically-adjacent pixel pairs.

16. The image sensor of claim 15, the memory further storing machine-readable instructions that, when executed by the processor, control the processor to, for each of the plurality of two-by-two pixel subarrays:

capture comprising generating, with the image sensor, pixel values $V_1$, $V_2$, $V_3$, and $V_4$ from a top-left pixel, a top-right pixel, a bottom-left pixel, and a bottom-right pixel, respectively, of the two-by-two pixel subarray;

compute the horizontal-difference image comprising determining the first derived pixel value as a first increasing function of $(V_1+V_3)-(V_2+V_4)$;

compute the vertical-difference image comprising determining the second derived pixel value as a second increasing function of $(V_3+V_4)-(V_1+V_2)$; and the combining comprising determining a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

17. The image sensor of claim 14, the memory further storing machine-readable instructions that, when executed by the processor, control the processor to:

compute an intensity image that includes, for each of the plurality of horizontally-adjacent pixel pairs and a most proximate vertically-adjacent pixel pair of the plurality of vertically-adjacent pixel pairs thereto, a summation pixel value being (i) mapped to a location within the pixel array adjacent to one of the horizontally-adjacent pixel pair and the most proximate vertically-adjacent pixel pair and (ii) an increasing function of a sum of pixel values generated by each pixel of the horizontally-adjacent pixel pair and the most proximate vertically-adjacent pixel pair; and determine the image distance comprising determining the image distance from the combined image and the intensity image.

18. The image sensor of claim 17, each of the plurality of vertically-adjacent pixel pairs being beneath a respective one of the first plurality of microlenses, each of the first plurality of microlenses being above a respective two-by-two pixel subarray, of a plurality of two-by-two pixel subarrays of the pixel array, each pixel of the two-by-two pixel subarray being both (i) a pixel of one of the plurality of horizontally-adjacent pixel pairs and (ii) a pixel of one of the plurality of vertically-adjacent pixel pairs;

the memory further storing machine-readable instructions that, when executed by the processor, control the processor to, for each of the plurality of two-by-two pixel subarrays:

when capturing, generate, with the image sensor, pixel values $V_1$, $V_2$, $V_3$, and $V_4$ from a top-left pixel, a top-right pixel, a bottom-left pixel, and a bottom-right pixel, respectively, of the two-by-two pixel subarray;

when computing the horizontal-difference image, determine the first derived pixel value as a first increasing function of $(V_1+V_3)-(V_2+V_4)$;

when computing the vertical-difference image, determine the second derived pixel value as a second increasing function of $(V_3+V_4)-(V_1+V_2)$;

when computing the intensity image, determine the summation pixel value as a third increasing function of $(V_1+V_2+V_3+V_4)$; and when combining, determine a third derived pixel value, of the combined image, that is a third increasing function of one of (i) a sum of respective squares of the first derived pixel value and the second derived pixel value and (ii) a sum of respective absolute values of the first derived pixel value and the second derived pixel value.

19. The image sensor of claim 18, the first increasing function being $((V_1+V_3)-(V_2+V_4))/(V_1+V_2+V_3+V_4)$;

the second increasing function being $((V_3+V_4)-(V_1+V_2))/(V_1+V_2+V_3+V_4)$.

20. The image sensor of claim 14, the memory further storing machine-readable instructions that, when executed by the processor, control the processor to, when determining the image distance:

process at least part of the combined image with a neural network to determine the image distance, the neural network having been trained via supervised learning based on training images captured by a training camera having a training-camera lens and a training-camera pixel array that are identical to the lens and the pixel array respectively.

21. A camera comprising:

the image sensor of claim 14; and the lens aligned to the image sensor such that an axial chief ray transmitted by the lens is incident on the image sensor.

* * * * *